US012587931B2

(12) United States Patent
Sasaki et al.

(10) Patent No.: US 12,587,931 B2
(45) Date of Patent: Mar. 24, 2026

(54) CONNECTION DESTINATION SWITCHING CONTROL METHOD, COMMUNICATION APPARATUS AND PROGRAM

(71) Applicant: NTT, Inc., Tokyo (JP)

(72) Inventors: Motoharu Sasaki, Tokyo (JP); Nobuaki Kuno, Tokyo (JP); Toshiro Nakahira, Tokyo (JP); Minoru Inomata, Tokyo (JP); Wataru Yamada, Tokyo (JP); Takatsune Moriyama, Tokyo (JP)

(73) Assignee: NTT, Inc., Tokyo (JP)

( * ) Notice: Subject to any disclaimer, the term of this patent is extended or adjusted under 35 U.S.C. 154(b) by 431 days.

(21) Appl. No.: 18/255,743

(22) PCT Filed: Jan. 13, 2021

(86) PCT No.: PCT/JP2021/000921
§ 371 (c)(1),
(2) Date: Jun. 2, 2023

(87) PCT Pub. No.: WO2022/153414
PCT Pub. Date: Jul. 21, 2022

(65) Prior Publication Data
US 2024/0107413 A1     Mar. 28, 2024

(51) Int. Cl.
*H04W 36/30* (2009.01)
*H04W 36/00* (2009.01)
*H04W 36/36* (2009.01)

(52) U.S. Cl.
CPC ... *H04W 36/302* (2023.05); *H04W 36/00833* (2023.05); *H04W 36/362* (2023.05)

(58) Field of Classification Search
CPC ......... H04W 36/302; H04W 36/00833; H04W 36/362; H04W 36/008375
See application file for complete search history.

(56) References Cited

U.S. PATENT DOCUMENTS

| | | | |
|---|---|---|---|
| 8,275,324 B2 * | 9/2012 | Wilborn | H04W 52/223 |
| | | | 455/127.2 |
| 2004/0185786 A1 * | 9/2004 | Mirbaha | H04B 17/373 |
| | | | 455/67.11 |

(Continued)

FOREIGN PATENT DOCUMENTS

| | | | |
|---|---|---|---|
| CN | 111343680 | 6/2020 | |
| CN | 111343680 A * | 6/2020 | ........ H04W 36/0058 |

(Continued)

OTHER PUBLICATIONS

Nishikawa, Network Management Device, Communication System, Communication Control Method, and Program, 2017, JP-217175317, pp. 1-35.*

(Continued)

*Primary Examiner* — Steven Hieu D Nguyen
(74) *Attorney, Agent, or Firm* — IPUSA, PLLC

(57) ABSTRACT
A connection destination switching control method executed by a communication apparatus, the connection destination switching control method comprising: a data acquisition step of acquiring observed values of received power of signals transmitted from a base station; a prediction processing step of predicting future received power by using the observed values acquired in the data acquisition step as input data into a prediction model; and a connection destination switching processing step of executing control for handover based on the future received power predicted in the prediction processing step.

7 Claims, 19 Drawing Sheets

(56) References Cited

U.S. PATENT DOCUMENTS

| 2012/0238272 A1* | 9/2012 | Hwang | H04W 36/245 |
| | | | 455/436 |
| 2013/0150053 A1* | 6/2013 | Hwang | H04W 36/00837 |
| | | | 455/436 |
| 2016/0353299 A1* | 12/2016 | Sayeed | H04W 36/304 |
| 2017/0094563 A1* | 3/2017 | Yang | H04W 36/324 |
| 2020/0259575 A1* | 8/2020 | Bai | H04B 17/24 |

FOREIGN PATENT DOCUMENTS

| JP | 2017-175317 | | 9/2017 |
| JP | 2017175317 A | * | 9/2017 |

OTHER PUBLICATIONS

Pan, A switching method based on reference signal received power prediction method for reducing time delay, 2020, CN-111343680-A, pp. 1-11.*

Changqing Luo, Jinlong Ji, Qianlong Wang, Xuhui Chen, and Pan Li, "Channel State Information Prediction for 5G Wireless Communications: A Deep Learning Approach", IEEE Transactions on Network Science and Engineering, vol. 7, No. 1, Jan.-Mar. 2020.

Konishi et al., "Effects of Automatic Optimization by Self-Organizing Networks (SON) Technology for LTE/LTE-Advanced Systems", vol. J97-B No. 8 pp. 599-610, Aug. 2014.

NTT Docomo, Inc. All Rights Reserved., "White paper, 5G Enhancement and 6G", Jul. 2020.

* cited by examiner

Fig. 1

CONNECTION DESTINATION SWITCHING CONTROL METHOD, COMMUNICATION APPARATUS AND PROGRAM

TECHNICAL FIELD

The present invention relates to handover in which a user terminal switches a connection destination base station in a wireless communication system.

BACKGROUND ART

In a cellular wireless communication system, a connection destination base station to which a user terminal is connected is switched as the user terminal moves. Switching of the connection destination base station is referred to as handover (HO).

The user terminal detects an event that triggers handover processing on the basis of received power of signals from the connection destination base station that is a base station of a serving cell and received power of signals from a neighboring base station that is a base station of a neighboring cell (Non Patent Literature 2).

Meanwhile, in a wireless communication system of 6G or later, advanced requirements are required as compared with 5G, such as ultra-high speed and large capacity, ultra-low delay and high reliability, and ultra-multiple connection. In order to satisfy the requirements, use of a high frequency band is expanded (that is, the cell size is narrowed), and a complicated configuration called new network topology, in which areas of a plurality of cells overlap, has been studied as a cell configuration.

In such a wireless NW configuration, it is assumed that switching of the connection destination base station occurs more frequently than before.

CITATION LIST

Non Patent Literature

Non Patent Literature 1 Changqing Luo, Jinlong Ji, Qianlong Wang, Xuhui Chen, and Pan Li, "Channel State Information Prediction for 5G Wireless Communications: A Deep Learning Approach", IEEE TRANSACTIONS ON NETWORK SCIENCE AND ENGINEERING, VOL. 7, NO. 1, JANUARY-MARCH 2020 Non Patent Literature 2: Konishi et al., "Effects of Automatic Optimization by Self-Organizing Networks (SON) Technology for LTE/LTE-Advanced Systems"
Non Patent Literature 3: DOCOMO 6G white paper

SUMMARY OF INVENTION

Technical Problem

In a situation where use of a high frequency band is expanded (the cell size is narrowed) and a large number of cells overlap, which is assumed in a future wireless communication system, the number of signals from base stations for which handover conditions are to be checked in the user terminal increases, and the received power fluctuates at a higher speed than before.

Therefore, processing related to handover is overload, and smooth handover processing cannot be performed. As a result, it is considered that an event occurs in which the radio quality greatly decreases before handover or handover processing frequently occurs. That is, there is a possibility that the user terminal cannot appropriately perform handover.

The present invention has been made in view of the above points, and an object of the present invention is to provide a technique that enables a user terminal to appropriately perform handover in a cellular wireless communication system.

Solution to Problem

According to the disclosed technique, there is provided a connection destination switching control method executed by a communication apparatus, the connection destination switching control method including:
a data acquisition step of acquiring observed values of received power of signals transmitted from a base station;
a prediction processing step of predicting future received power by using the observed values acquired in the data acquisition step as input data into a prediction model; and
a connection destination switching processing step of executing control for handover based on the future received power predicted in the prediction processing step.

Advantageous Effects of Invention

According to the disclosed technique, there is provided a technique that enables a user terminal to appropriately perform handover in a cellular wireless communication system.

BRIEF DESCRIPTION OF DRAWINGS

FIG. 1 is a system configuration diagram in an embodiment of the present invention.

DESCRIPTION OF EMBODIMENTS

Hereinafter, embodiments of the present invention (present embodiments) will be described with reference to the drawings. The embodiments described below are merely examples, and embodiments to which the present invention is applied are not limited to the following embodiments. Hereinafter, configurations and operations of the present embodiments will be described with reference to a first embodiment and a second embodiment.

First Embodiment

System Configuration

Figure 1:
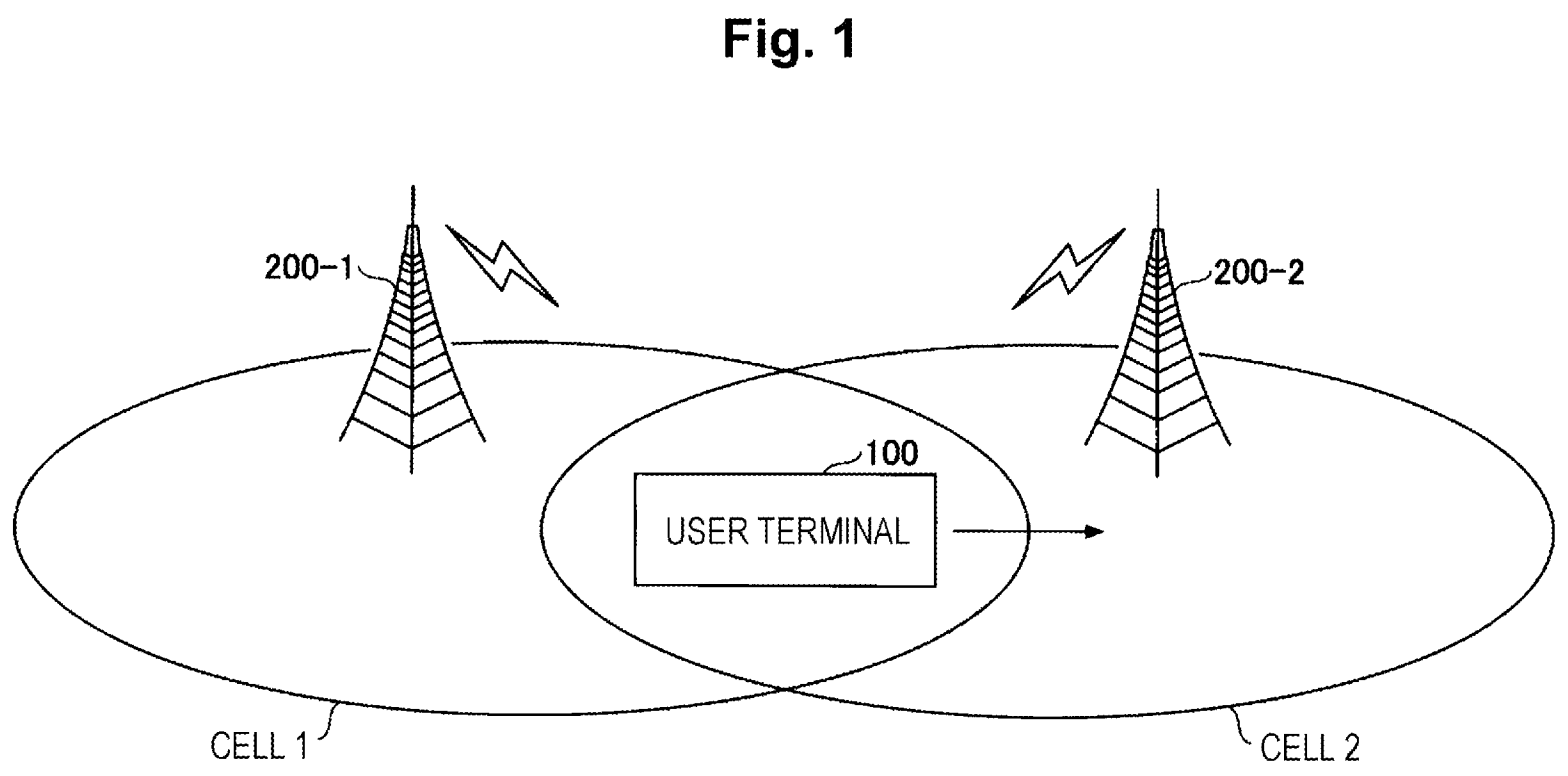

FIG. 1 illustrates a configuration example of a wireless communication system in the first embodiment. The wireless communication system in the first embodiment is a cellular wireless communication system. Although there are a large number of cells in the wireless communication system, FIG. 1 illustrates only a cell 1 and a cell 2. In addition, the wireless communication system in the first embodiment is not limited to a specific system. For example, the wireless communication system in the first embodiment may be any of 3G, LTE, 5G, and 6G.

In the example illustrated in FIG. 1, a base station 200-1 forms the cell 1, and a base station 200-2 forms the cell 2. A user terminal 100 is connected to a base station of a serving cell and performs wireless communication.

In the example of FIG. 1, it is assumed that the user terminal 100 connected to the base station 200-1 is moving in the direction of the cell 2. At this time, the user terminal 100 performs handover for switching a connection destination base station 200 from the base station 200-1 to the base station 200-2.

Example of Handover Processing

In the first embodiment, a handover method itself is not particularly limited, but as an example, an example of handover processing will be described with reference to FIGS. 2 and 3 on the basis of a method used in LTE or LTE-Advanced.

Figure 2:
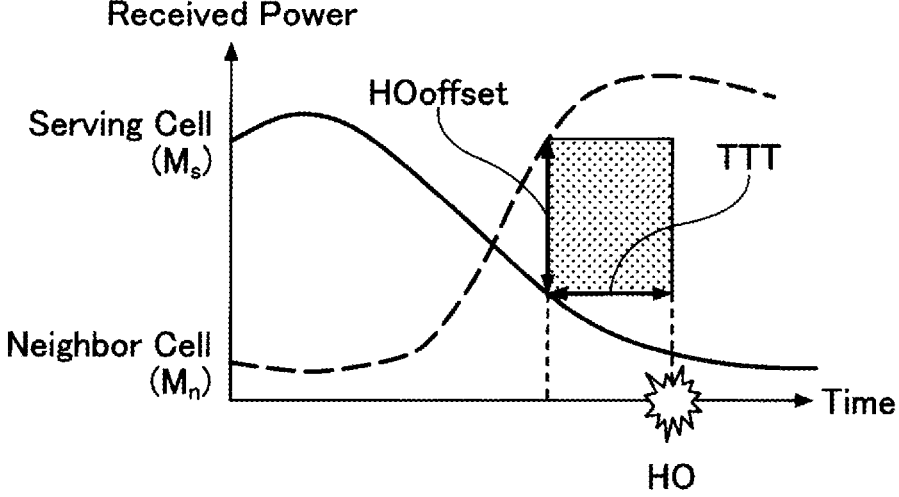
FIG. 2 is a diagram for describing an example of an event that triggers handover.

Curves illustrated in FIG. 2 indicate changes in received power from the serving cell and received power from a neighboring cell in the user terminal 100. When detecting an event (for example, an A3 event) that triggers handover (HO), the user terminal 100 transmits a measurement report (MR) to the connection destination base station 200-1. This triggers the handover processing.

A detection condition of the event is, for example, that $M_n + HO_{offset,\,s,\,n} > M_s$ continues for a certain period (time to trigger: TTT) or longer. Here, $M_s$ is received power of a serving cell s, $M_n$ is received power of a neighboring cell n, and $HO_{offset,\,s,\,n}$ is an offset value uniquely set between the cells s and n.

Note that, as described later, in the present embodiment, the user terminal 100 predicts future received power by using observed values of received power from the past to the present, and detects an event that triggers handover by using the predicted received power.

Figure 3:
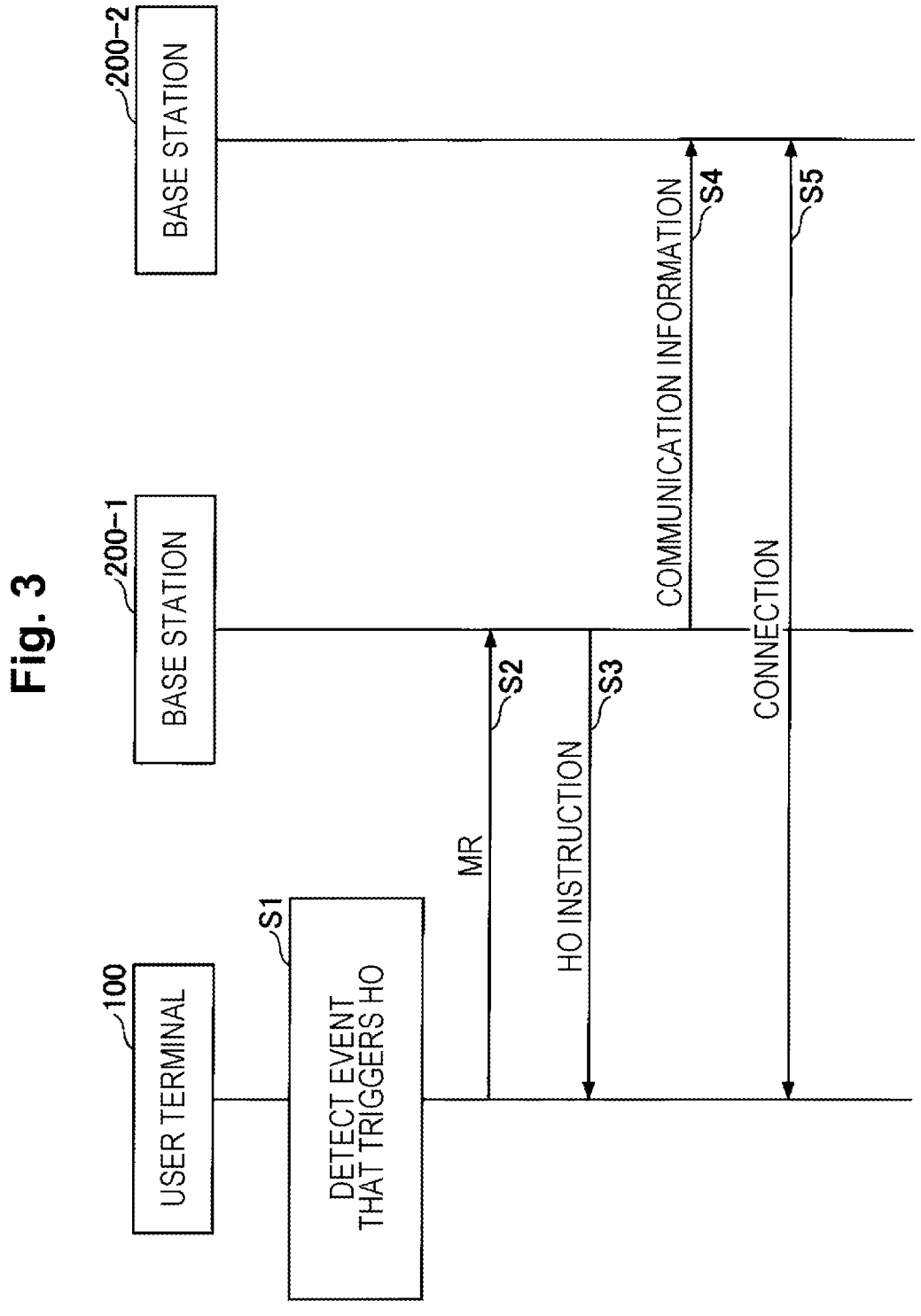
FIG. 3 is a diagram illustrating an example of a procedure of handover.

FIG. 3 is a sequence diagram illustrating an example of the handover processing. In the example of FIG. 3, it is assumed that the user terminal 100 switches the connection destination base station from the base station 200-1 to the base station 200-2 by handover.

In S1, the user terminal 100 detects an event that triggers handover. In S2, the user terminal 100 transmits an MR to the base station 200-1. The MR includes a cell ID (which may also be referred to as a base station ID) and a measurement result (received power) for each cell in which the received power has been measured.

The base station 200-1 that has received the MR determines to hand over the user terminal 100 to the neighboring base station 200-2, and transmits a handover instruction to instruct the user terminal 100 to be connected to the base station 200-2 to the user terminal 100 in S3. Furthermore, the base station 200-1 transmits information regarding communication with the user terminal 100 to the base station 200-2. The user terminal 100 that has received the handover instruction is connected to the base station 200-2 in S5. This completes the handover.

As described above, in the future, it is assumed that the cell size is narrowed and a very large number of cells overlap, and it is assumed that the number of signals from base stations for which the condition of the occurrence of the event is to be checked increases and the received power fluctuates at a higher speed. Therefore, there is a possibility that processing related to handover will be overloaded and smooth handover processing cannot be performed.

In the first embodiment, in order to solve the above problem, the user terminal 100 predicts received power in the future (for example, a few seconds ahead) using observation results of received power from the past to the present for each cell (base station) in which the received power is measured by using a prediction technique such as deep learning, thereby smoothly performing the processing related to handover. Hereinafter, configurations and operations using the prediction technique such as deep learning will be described in more detail.

Configuration Example of User Terminal 100

Figure 4:
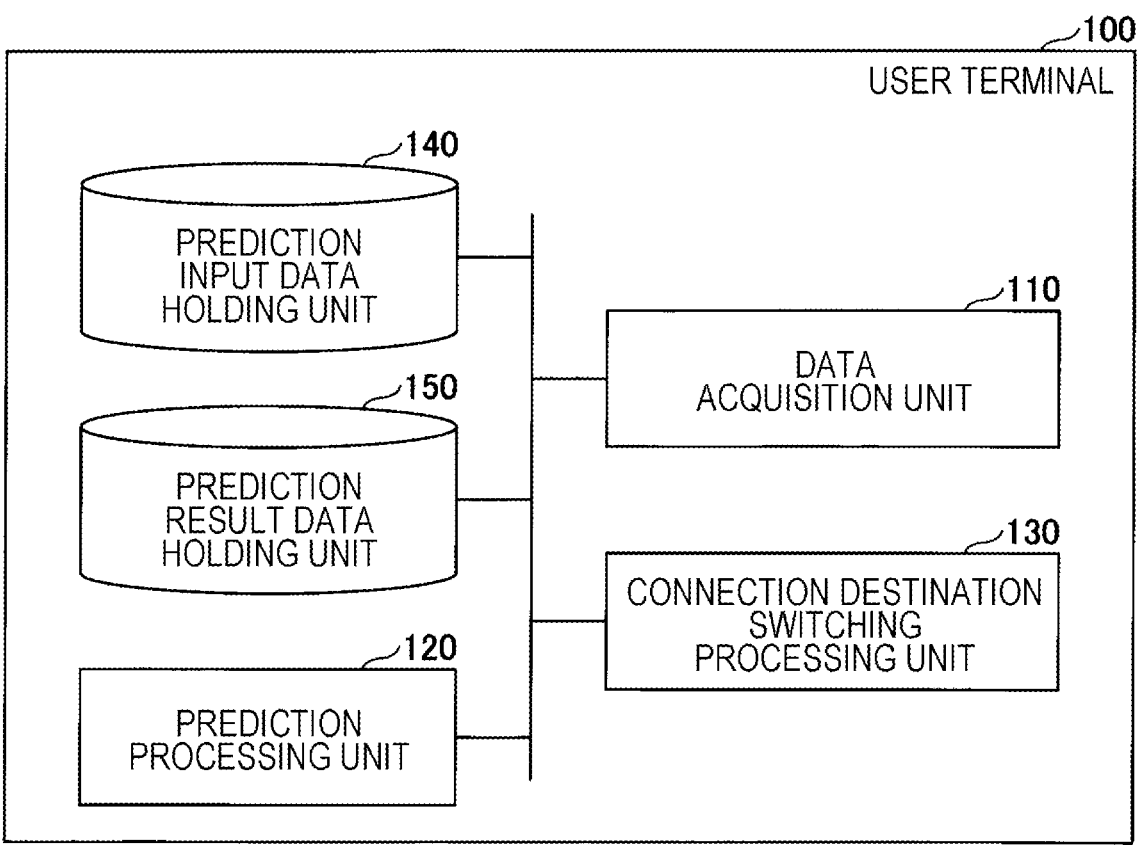
FIG. 4 is a functional configuration diagram of a user terminal 100 in a first embodiment.

FIG. 4 illustrates an exemplary functional configuration of the user terminal 100 in the first embodiment. As illustrated in FIG. 4, the user terminal 100 includes a data acquisition unit 110, a prediction processing unit 120, a connection destination switching processing unit 130, a prediction input data holding unit 140, and a prediction result data holding unit 150. Note that the user terminal 100 may be referred to as a communication apparatus.

The data acquisition unit 110 receives a signal from each base station and performs measurement to acquire a cell ID and received power (observed values). The data acquired by the data acquisition unit 110 is stored, as prediction input data, in the prediction input data holding unit 140. The prediction processing unit 120 uses the data read from the prediction input data holding unit 140 as an input, predicts future received power from past received power (observed values), and stores a prediction result in the prediction result data holding unit 150.

The connection destination switching processing unit 130 performs connection destination switching processing (handover control) using the data of the prediction result read from the prediction result data holding unit 150. The connection destination switching processing includes specification (narrowing down) of a base station as a switching destination, transmission of an MR, connection processing with the connection destination base station after handover, and the like.

Figure 10:
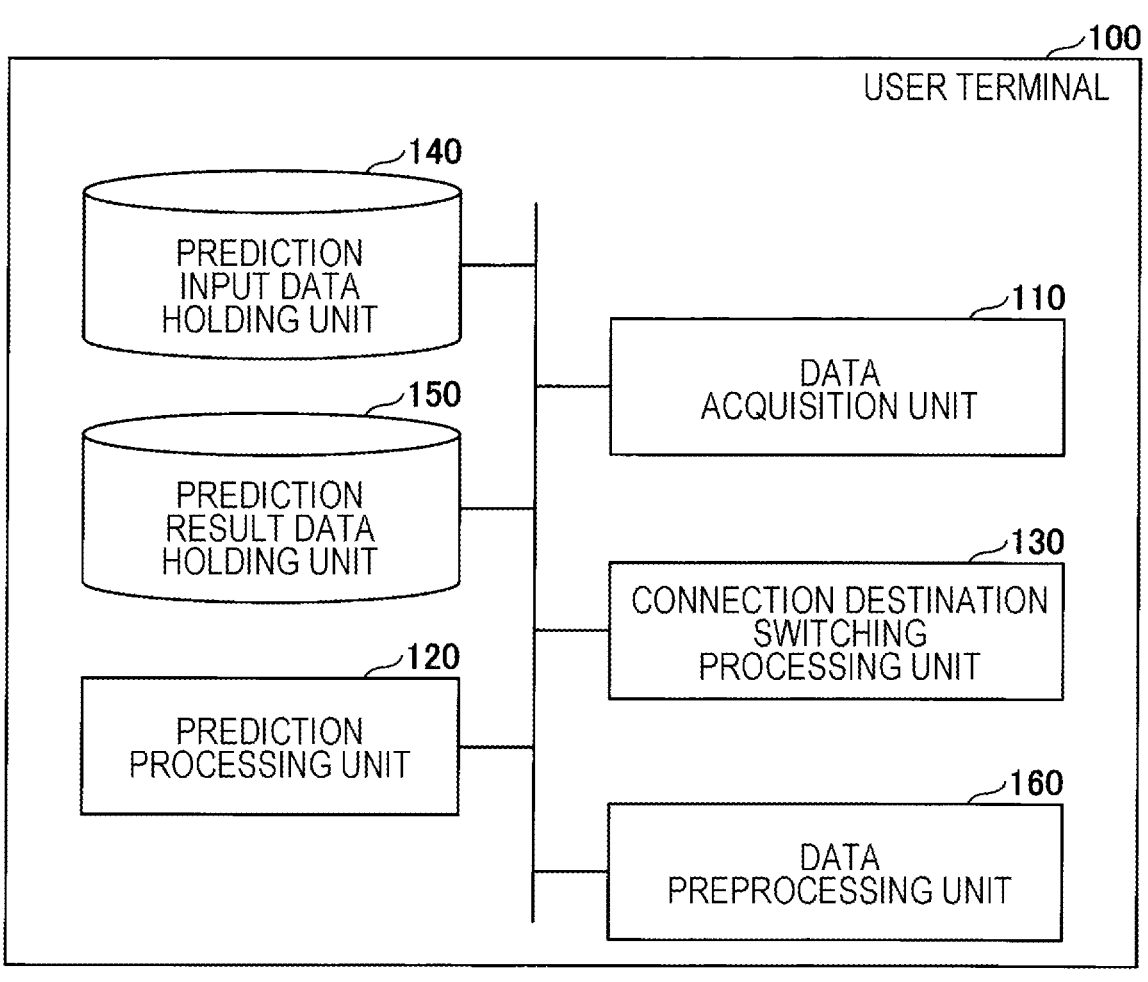
FIG. 10 is a functional configuration diagram of a user terminal 100 in a second embodiment.

Note that, in the first embodiment (and the second embodiment), the user terminal 100 performs the prediction processing of the received power and the handover control, but the prediction processing of the received power and the handover control may be performed in a base station (which may be referred to as a communication apparatus). The configuration of the base station in this case is similar to the configuration illustrated in FIG. 4 (FIG. 10 in the second embodiment). However, in this case, the base station receives received power as observed values from the user terminal 100, and predicts future received power using the observed values. Furthermore, as the handover control, the base station notifies the user terminal 100 of a connection destination base station as a handover destination specified on the basis of the future received power.

Hardware Configuration Example

Here, a hardware configuration example of the user terminal 100 in the first embodiment will be described. A hardware configuration of the user terminal 100 in the second embodiment is also as described below. Furthermore, a hardware configuration of a base station is also as described below.

The user terminal 100 (and the base station) can be implemented, for example, by a computer executing a program. A mobile phone, a smartphone, and the like are examples of the computer.

That is, the user terminal 100 can be implemented by a program corresponding to the processing to be performed in the user terminal 100 being executed by use of hardware resources such as a CPU and a memory built in the computer. The above program can be stored and distributed by being recorded in a computer-readable recording medium (portable memory or the like). Furthermore, the above program can also be provided through a network such as the Internet or an electronic mail.

Figure 5:
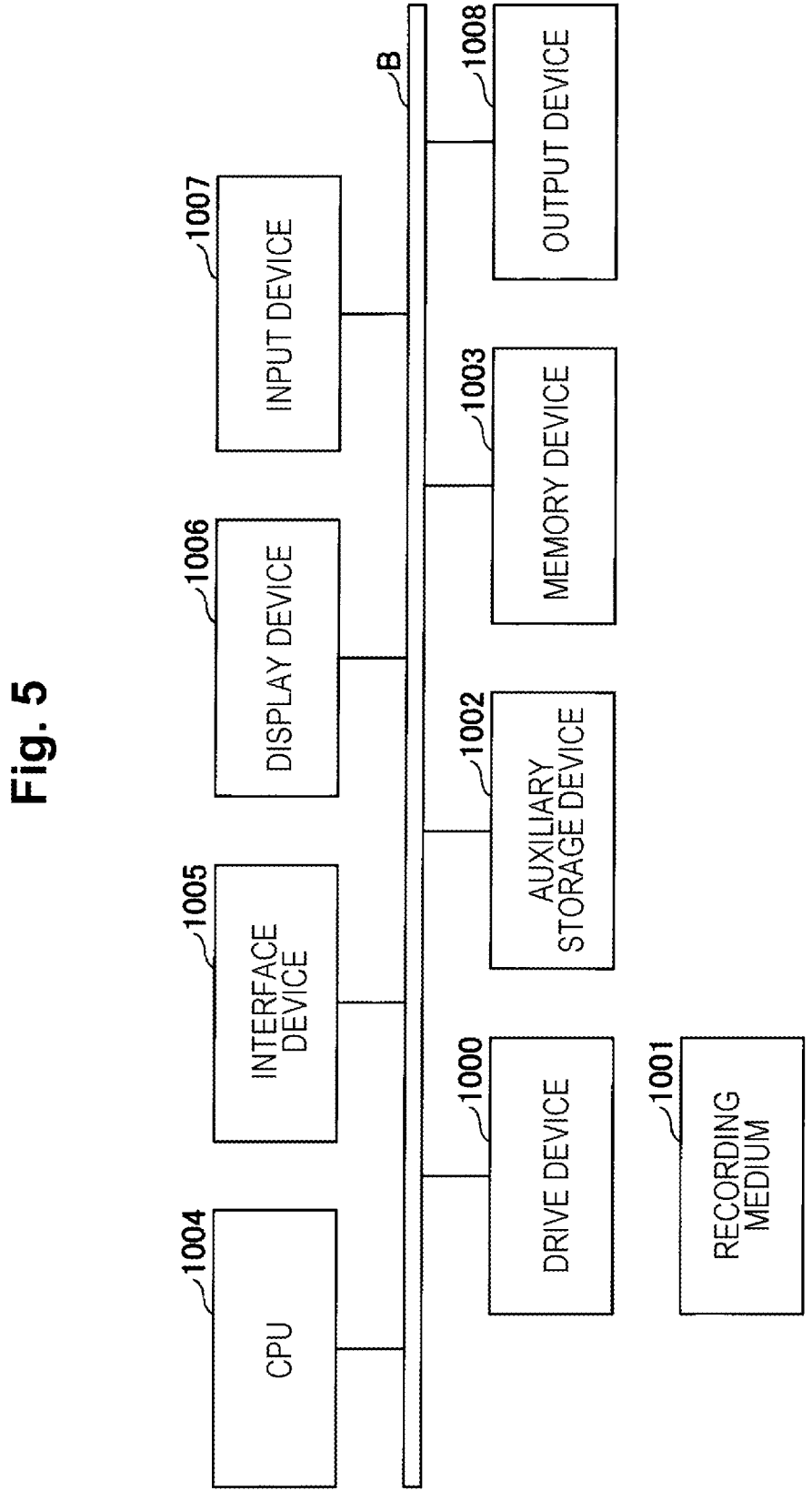
FIG. 5 is a diagram illustrating a hardware configuration example of the user terminal 100.

FIG. 5 is a diagram illustrating a hardware configuration example of the computer. The computer of FIG. 5 includes a drive device 1000, an auxiliary storage device 1002, a memory device 1003, a CPU 1004, an interface device 1005, a display device 1006, an input device 1007, and the like, which are connected to each other via a bus B.

The program for implementing the processing in the computer is provided by, for example, a recording medium 1001 such as a CD-ROM or a memory card. When the recording medium 1001 storing the program is set in the drive device 1000, the program is installed from the recording medium 1001 to the auxiliary storage device 1002 via the drive device 1000. However, the program is not necessarily installed from the recording medium 1001, and may be downloaded from another computer via a network. The auxiliary storage device 1002 stores the installed program and also stores necessary files, data, and the like.

In a case where an instruction to start the program is made, the memory device 1003 reads and stores the program from the auxiliary storage device 1002. The CPU 1004 implements a function related to the user terminal 100 according to the program stored in the memory device 1003. The interface device 1005 is used as an interface for connection to a network, and functions as an input means and an output means via the network. The display device 1006 displays a graphical user interface (GUI) or the like by the program. The input device 157 includes a keyboard and mouse, buttons, a touch panel, or the like, and is used to input various operation instructions.

Example of Prediction Processing Unit 120

As the prediction processing unit 120 in the first embodiment, a prediction model by a neural network is used. Specifically, a deep neural network (DNN) that performs deep learning is used. As the DNN, long short-term memory (LSTM), which is one of recurrent neural networks (RNNs) used for time series prediction, is used. Note that using the LSTM is an example. Instead of the LSTM or in addition to the LSTM, a gated recurrent unit (GRU) may be used. In addition, an RNN other than the LSTM and the GRU may be used.

Figure 6:
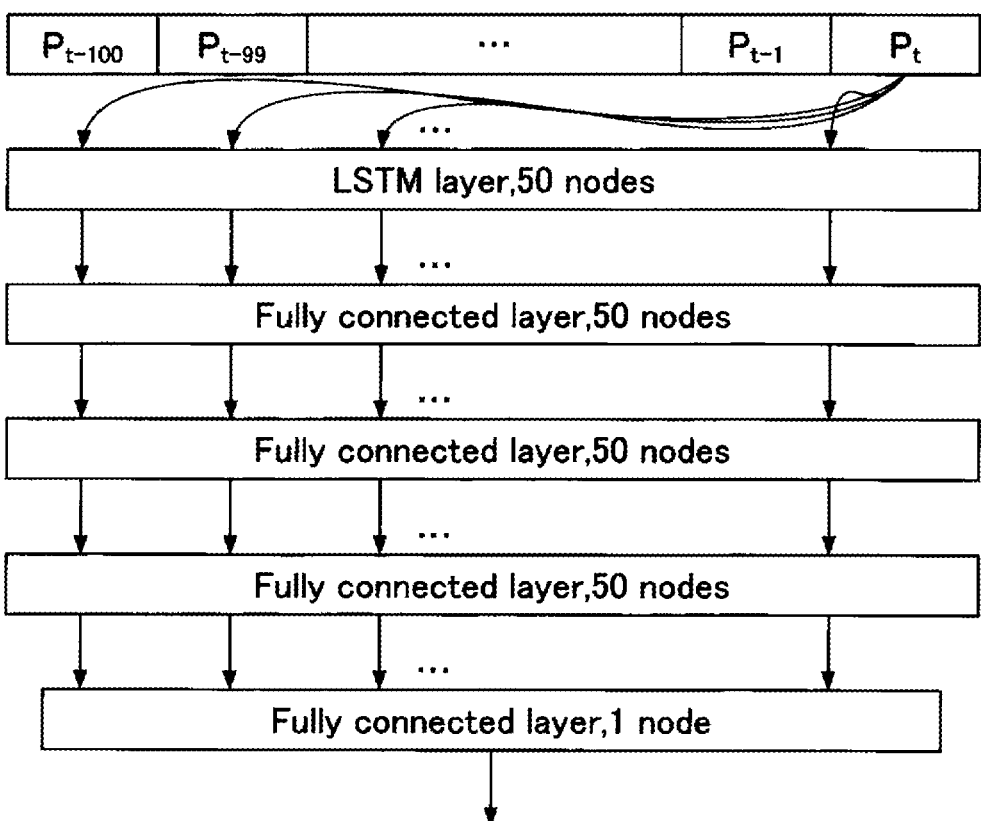
FIG. 6 is a diagram illustrating an example of a prediction model used in a prediction processing unit 120.

FIG. 6 illustrates an example of the prediction model used in the prediction processing unit 120. The prediction model illustrated in FIG. 6 includes an LSTM layer (50 nodes), three fully connected layers (50 nodes each layer), and one fully connected layer (1 node). Received power (observed values in the first embodiment, statistical values in the second embodiment) is sequentially input into the prediction model. For example, when received power after one second from a certain time t is predicted, a predetermined number (for example, 100) of pieces of received power from a predetermined period (for example, 10 seconds) before the time t to the time t are input into the prediction model. The prediction model outputs a predicted value of received power at a time t 1 on the basis of the input received power.

Figure 7:
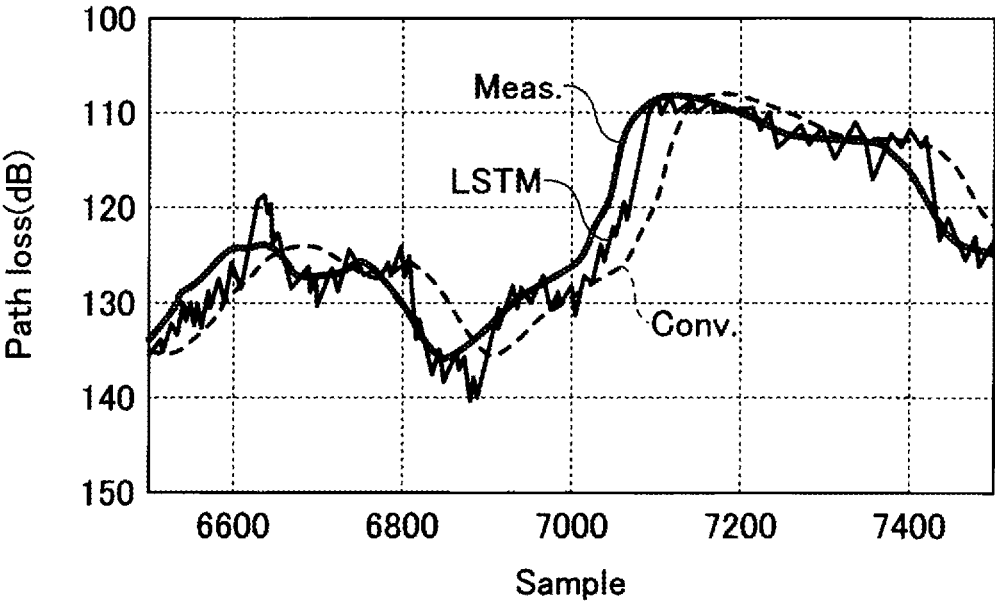
FIG. 7 is a diagram illustrating an example of a prediction result.

An object to be predicted is not limited to the received power, and a path loss can be predicted. FIG. 7 is a diagram comparing prediction by a prediction model using the LSTM, prediction by a conventional method (Cony) not using the LSTM, and actual measurement values. The horizontal axis indicates samples of observation points, and the vertical axis indicates the path loss. As illustrated in FIG. 7, it can be seen that the LSTM can perform prediction closer to the actual measurement values than the conventional method.

Learning of the prediction model as illustrated in FIG. 6 can be performed by use of an existing method such as an error back propagation method, using, for example, the actual measurement values as correct answer data.

Processing Procedure

An operation example of the user terminal 100 having the configuration of FIG. 4 will be described with reference to FIG. 8. In S101, handover conditions are set in the connection destination switching processing unit 130 of the user terminal 100. Here, setting of the handover conditions is, for example, setting the condition that "$M_n + HO_{offset, s, n} > M_s$ continues for a certain period (time to trigger: TTT) or longer" and setting values of $HO_{offset, s, n}$ and TTT.

Figure 8:
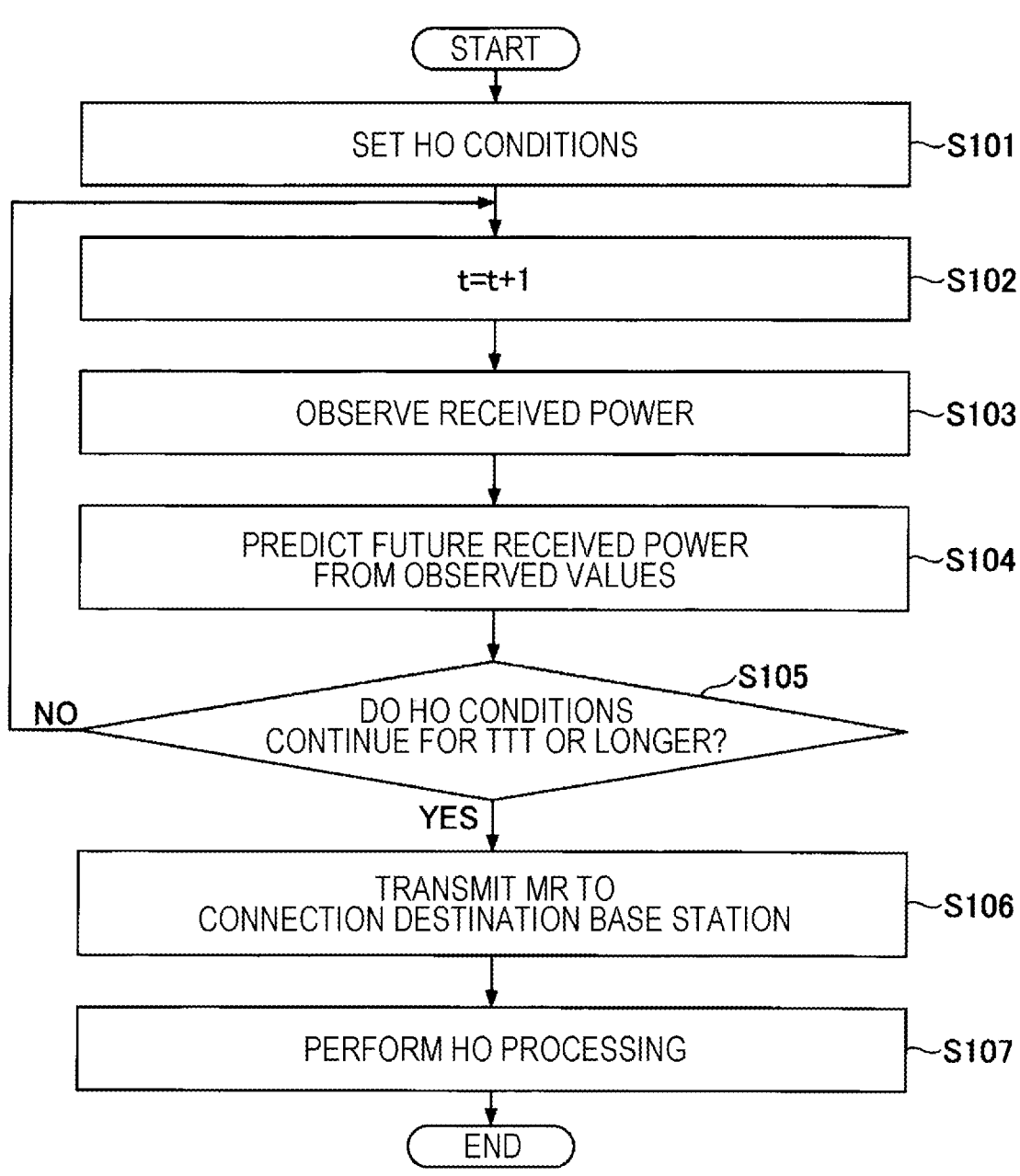
FIG. 8 is a diagram illustrating an operation example of the user terminal 100.

In the flow of FIGS. 8, S103 and S104 are performed for each cell (the serving cell and each neighboring cell). The determination in S105 is performed for each set of the serving cell and a neighboring cell. Here, for convenience of description, the description is appropriately given assuming that the cell 1 (the cell of the base station 200-1) is the serving cell and the cell 2 (the cell of the base station 200-2) is the neighboring cell.

In S103, the data acquisition unit 110 of the user terminal 100 observes each of received power of the serving cell and received power of the neighboring cell, and acquires observed values of the received power of each of the cells.

In S104, the observed values of the received power of each of the cells are sequentially input into the prediction processing unit 120, and the prediction processing unit 120 predicts future received power of each of the cells. For example, assuming that the current time is t, received power after k seconds from t is predicted. k may be any one of 1, 2, 3, 4, 5, 6, 7, 8, 9, and 10, or may be a value other than these.

In S105, the connection destination switching processing unit 130 of the user terminal 100 determines whether "$M_n + HO_{offset, s, n} > M_s$ continues for TTT or longer". Here, $M_s$ is a predicted value of the received power of the serving cell s, and $M_n$ is a predicted value of the received power of the neighboring cell n. If the determination in S105 is Yes, the processing proceeds to S106, and if the determination in S105 is No, the processing proceeds to S102. In the case where the processing proceeds to S102, the time t is updated, and the processing of S103 to S105 is performed for the next time t.

In the case where the processing proceeds to S106, the connection destination switching processing unit 130 of the user terminal 100 transmits an MR to the base station 200-1, which is a connection destination base station. The MR includes the cell ID of the base station 200-2 serving as a handover destination. As a result, the handover processing is performed in S107. An example of the handover processing is as described with reference to FIG. 3.

As described above, the connection destination switching processing unit 130 can perform the control related to the handover using the predicted value of the received power k seconds after the current time t. More specifically, any one or more sets of processing of the following Examples 1 to 3 may be performed.

Example 1

In Example 1, the connection destination switching processing unit 130 specifies a connection destination base station to which the user terminal 100 is to be handed over in advance. Predicting the connection destination base station in advance and performing handover makes it possible to maintain high wireless communication quality.

For example, it is assumed that there are a serving cell and neighboring cells A, B, and C. In S105 of FIG. 8, in a case where it is determined that only the received power of the neighboring cell B satisfies the condition from predicted values of the received power of the cells, the connection destination switching processing unit 130 specifies the base station of the neighboring cell B as a connection destination base station to which the user terminal 100 is to be handed over. As a result, an MR is transmitted at an early stage, so that the handover can be performed at an early stage, and the wireless communication quality can be maintained.

Example 2

In Example 2, the connection destination switching processing unit 130 narrows down connection destination base stations for which the handover conditions are to be observed in advance. Narrowing down the base stations to which the user terminal 100 is to be handed over in advance makes it possible to reduce a calculation load related to the handover. Note that "specifying" in Example 1 is an example of "narrowing down".

For example, it is assumed that there are a serving cell and neighboring cells A, B, C, and D. For example, at a certain time, in S104 of FIG. 8, in a case where the connection destination switching processing unit 130 detects, among predicted values of received power of the neighboring cells A, B, C, and D, the predicted values of the received power of the neighboring cells A and B being very low (for example, smaller than a certain threshold) and the predicted values of the received power of the neighboring cells C and D not being low (for example, larger than the certain threshold), the neighboring cells to be observed thereafter and the cells for which the handover conditions are to be determined are narrowed down to only the neighboring cells C and D.

The cells to be observed and the cells for which the handover conditions are to be determined are narrowed down, so that the processing load of the user terminal 100 is reduced. In addition, since the number of neighboring cells reported to the base station in S106 also decreases, the processing load on the base station side for determining the handover destination is also reduced.

Example 3

In Example 3, the connection destination switching processing unit 130 specifies a base station in which a set of handover processing occurs immediately after another set of handover processing and excludes the base station from possible connection destination base stations. This processing makes it possible to avoid occurrence of frequent handover processing and maintain high wireless communication quality.

For example, it is assumed that there are a serving cell and neighboring cells A, B, C, and D. In this example, the prediction processing unit 120 calculates, for each cell, a predicted value of received power after k seconds from the current time t, and calculates a predicted value of received power after (k r) seconds from the current time t. r is a short time, and may be, for example, one second, a time shorter than one second, or a time longer than one second.

The connection destination switching processing unit 130 performs processing of specifying a base station to which the user terminal 100 is handed over from the currently connected base station by the procedures of S102 to S105 illustrated in FIG. 8, using the predicted value of the received power (predicted value for each cell) after k seconds from the current time t.

In S105, when a base station of a neighboring cell determined to satisfy the handover conditions on the basis of the predicted value of the received power after k seconds is regarded as a new connection destination base station (referred to as a connection destination base station X) and the other base stations are regarded as base stations of neighboring cells, the connection destination switching processing unit 130 performs the determination of S105 using the calculated predicted value of the received power after (k+r) seconds. In a case where there is a base station determined to satisfy the handover conditions with respect to the connection destination base station X, the connection destination base station X is excluded from the possible handover destination base stations, and the determination of S102 to S105 is continued on the basis of the predicted value of the received power after k seconds from the current time t.

On the other hand, in a case where the determination in S105 is performed by use of the predicted value of the received power after (k+r) seconds from the current time t, and there is no base station determined to satisfy the handover conditions, the connection destination base station X is determined as a handover destination base station, and an MR having the cell ID of the connection destination base station X as the ID of the neighboring cell is transmitted to the current connection destination base station in S106.

Effects of First Embodiment

According to the technique described in the first embodiment, even in a case where the cell size is smaller and the overlapping of the cells increases, it is possible to avoid an event in which smooth handover processing cannot be performed (the radio quality greatly decreases before handover) or the handover processing frequently occurs.

In addition, connection destination base stations for which handover conditions are to be observed are narrowed down in advance, or a connection destination base station in which a set of handover processing occurs immediately after another set of handover processing is specified, and the connection destination base station is excluded from possible connection destination base stations, so that it is possible to reduce the calculation load related to the handover processing.

Second Embodiment

Next, the second embodiment will be described. The technique according to the second embodiment is assumed to be used in combination with the first embodiment. However, the technique according to the second embodiment may be used alone without being combined with the first embodiment.

Description of Background and Problem Related to Second Embodiment

As methods for predicting future information on the basis of information observed from the past to the present, various methods for predicting time-series information have been proposed. For example, as described in the first embodiment, as prediction methods using deep learning, there are various methods such as time series prediction using a recurrent neural network (RNN) and a method using a gated recurrent unit (GRU) or long short-term memory (LSTM), which is a method based on the RNN.

In particular, in the wireless communication field, these prediction methods are utilized for parameters such as amplitude and phase information of a received signal. These prediction methods are used for signal processing on a transmission signal by predicting parameters at a future time from a received signal. For example, amplitude and phase information necessary for signal processing such as multiple-input multiple-output (MIMO), which uses a plurality of transmission antennas and reception antennas, are predicted. These predictions are predictions on the order of microseconds to milliseconds, and the focus is on predicting instantaneous fluctuations of a signal.

In a case where prediction is performed on the order of seconds on the basis of observed values of received power as described in the first embodiment, it is assumed that the prediction is performed by using data of the observed values having instantaneous fluctuations as it is by a DNN using the LSTM or the like. In this case, there is a possibility that a temporal correlation of a received signal may become small due to the influence of the instantaneous fluctuations, and the observed values, on which the prediction is based, and information to be predicted may become uncorrelated, which may make the prediction difficult. Alternatively, in a case where such information including instantaneous fluctuations as uncorrelated fluctuations is to be predicted, such fluctuations can be regarded as data noise, and thus a result with low prediction accuracy is output.

Figure 9:
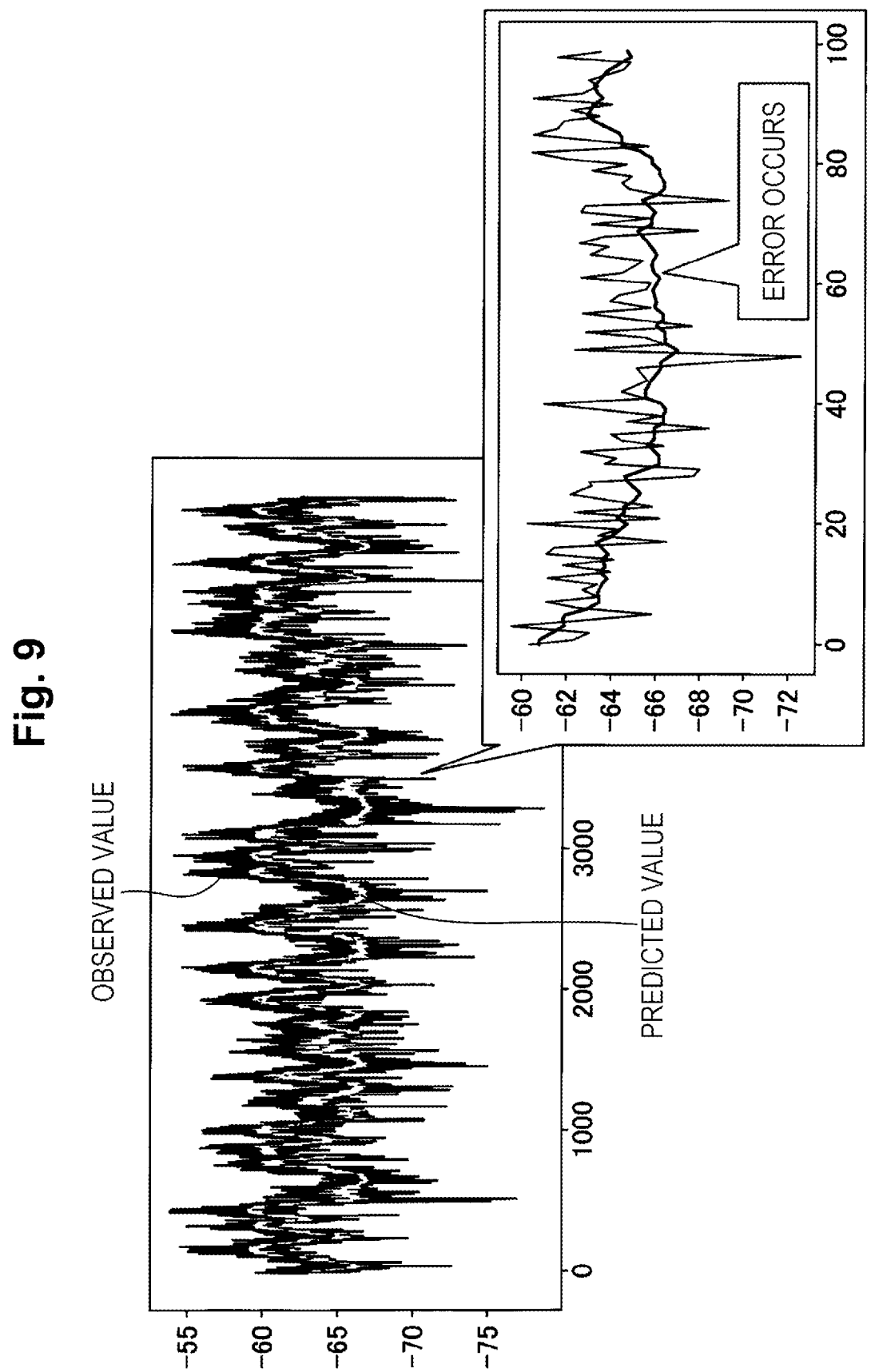
FIG. 9 is a diagram for describing a problem in received power prediction.

FIG. 9 illustrates an example in which the moving user terminal 100 predicts received power after one point from received power at the positions of the previous 50 points, using the DNN having the LSTM. In FIG. 9, the horizontal axis indicates the observation points, and the vertical axis indicates the received power. In the example of FIG. 9, instantaneous fluctuations of Nakagami-Rice fading (K factor=10 dB) are indicated as observed values, and predicted values are indicated by white. As illustrated in the lower right, errors occur in the predicted values. That is, the fluctuations of the signal cannot be predicted, and the fluctuations act as noise, which makes stable prediction impossible.

Outline of Prediction Method in Second Embodiment

Even in the second embodiment, as in the first embodiment, a DNN having LSTM or the like as illustrated in FIG. 6 is used as a prediction model. In the second embodiment, in order to solve the above problem, a statistical value (median value, average value, or the like) in a sequence length in consideration of the Doppler frequency (frequency or moving speed) of a received signal is used for input data into the prediction model and output data, so that it is possible to perform prediction in which the influence of instantaneous fluctuations is excluded from the received signal.

Device Configuration Example

A system configuration in the second embodiment is the same as that in the first embodiment, and is as illustrated in FIG. 1. FIG. 10 illustrates a functional configuration diagram of a user terminal 100 in the second embodiment. In the second embodiment, since statistical values as described above (values obtained by preprocessing observed values) are used in the prediction of the received power for each cell in the first embodiment, the user terminal 100 in the second embodiment has a configuration in which a data preprocessing unit 160 is added to the user terminal 100 in the first embodiment, as illustrated in FIG. 10.

The data preprocessing unit 160 reads observed values stored in the prediction input data holding unit 140 and performs preprocessing on the observed values to calculate statistical values, and uses the statistical values as inputs into the prediction processing unit 120 (prediction model).

For example, when received power after one second from a certain time t is predicted, a predetermined number (for example, 100) of statistical values from a predetermined period (for example, 10 seconds) before the time t to the time t are input into the prediction processing unit 120 (prediction model). The prediction processing unit 120 (prediction model) outputs a predicted value of the received power at the time t+1 on the basis of the input series of statistical values. The processing of the data acquisition unit 110 and the connection destination switching processing unit 130 is as described in the first embodiment.

Figure 11:
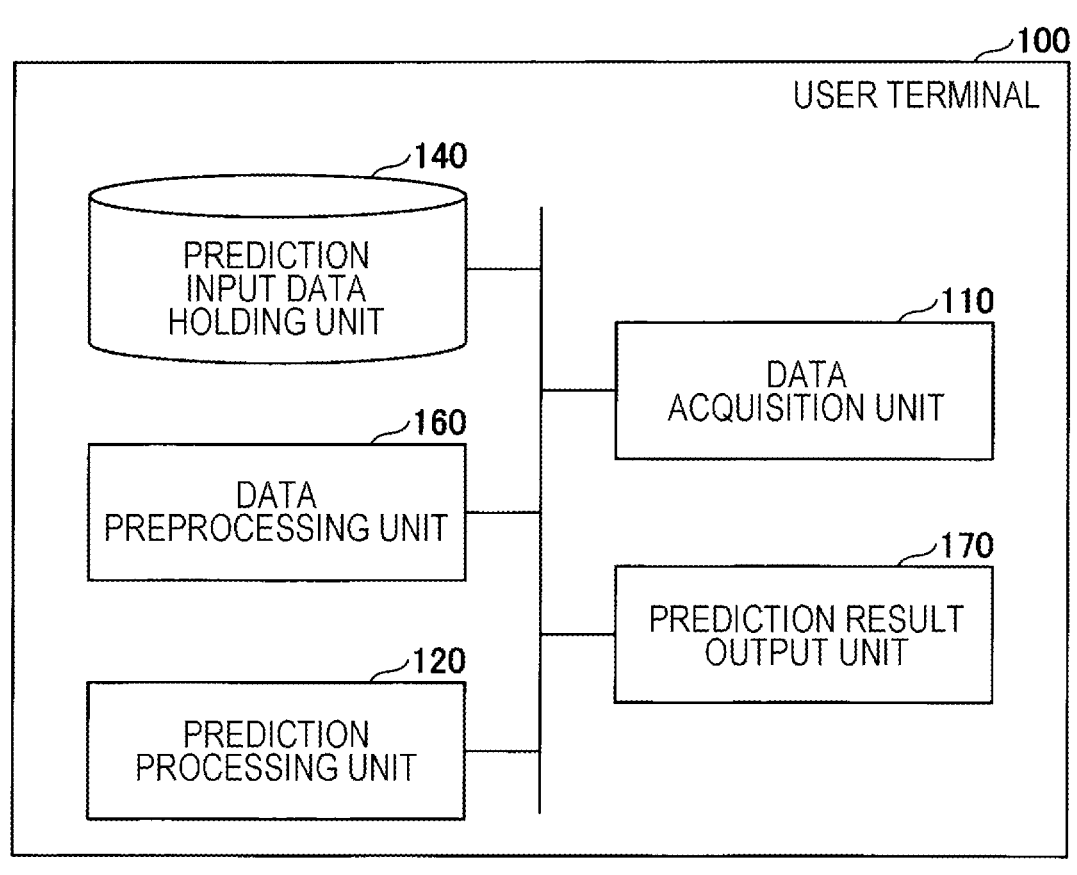
FIG. 11 is a functional configuration diagram of the user terminal 100 in the second embodiment.

Note that the prediction method in the second embodiment can be applied without being limited to the prediction of received power for handover processing described in the first embodiment. That is, the configuration illustrated in FIG. 11, which does not include the connection destination switching processing unit 130, may be adopted as a configuration of the user terminal 100 in the second embodiment. In the case of the configuration of FIG. 11, a prediction result obtained by the prediction processing unit 120 is output from a prediction result output unit 170.

Outline of Operation

The outline of the operation related to the prediction of received power of the user terminal 100 in the second embodiment will be described with reference to FIGS. 12 and 13.

Figure 12:
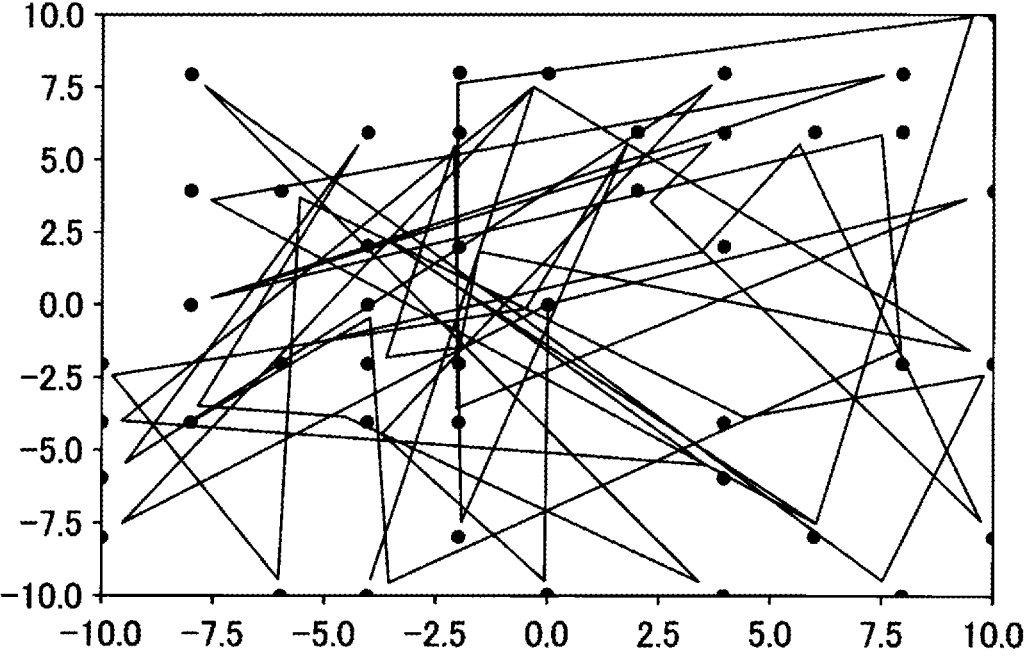
FIG. 12 is a diagram illustrating an example of movement of the user terminal 100.
Figure 13:
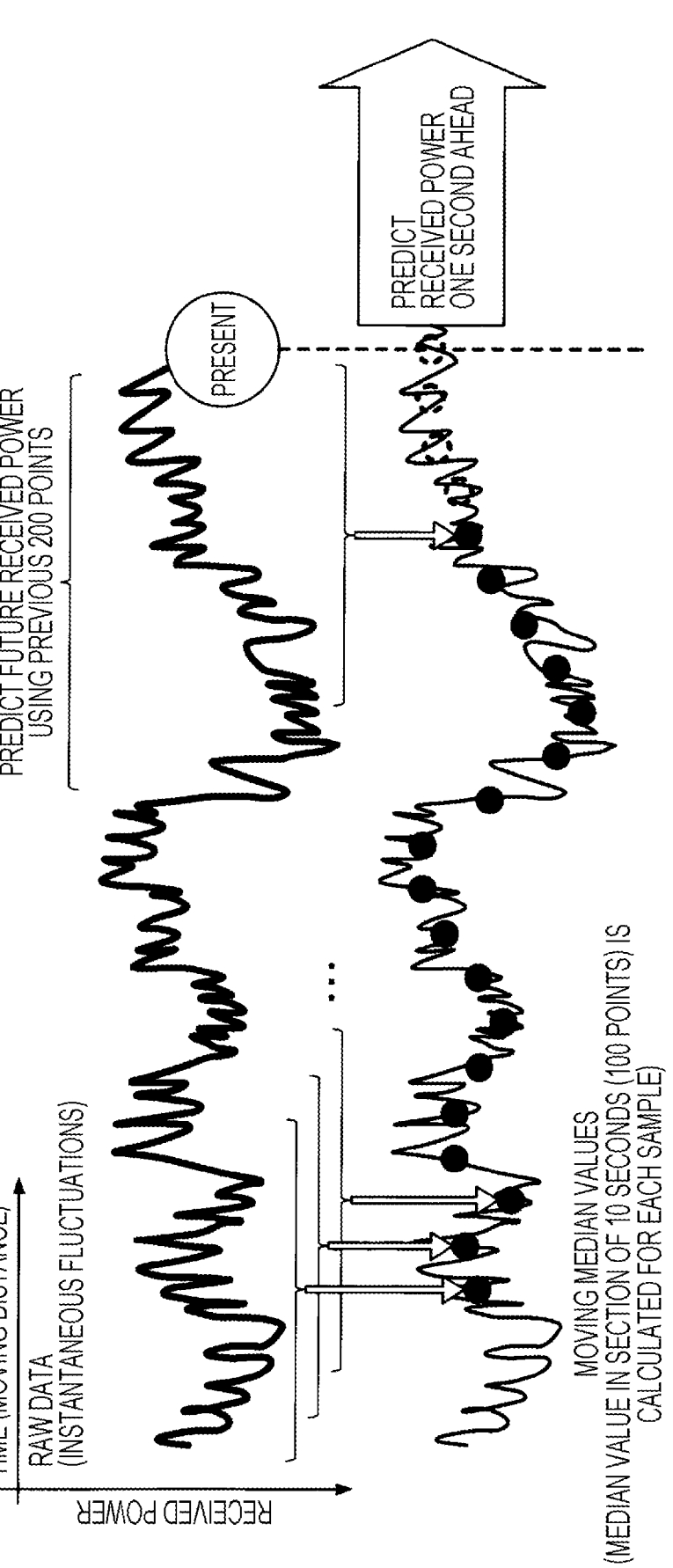
FIG. 13 is a diagram for describing an outline of processing in the second embodiment.

FIG. 12 illustrates a movement locus of the user terminal 100. FIG. 12 illustrates a situation in which the user terminal 100 linearly moves from a lattice point ● to another ●. When reaching a certain ●, the user terminal 100 changes the direction and advances to another ○.

Furthermore, the user terminal 100 moves, for example, by 0.1 m every 0.1 seconds, and the data acquisition unit 110 measures the received power every 0.1 seconds. In such a situation, the data acquisition unit 110 of the user terminal 100 acquires raw data illustrated as an image in FIG. 13 (data having instantaneous fluctuations), and stores the acquired data in the prediction input data holding unit 140.

For example, the data preprocessing unit 160 calculates a median value of data in a section of 10 seconds (that is, 100 points) while target points (target samples) are moved one by one. That is, the target samples are moved one by one, so that moving median values are calculated (or moving average values may be calculated). For example, the data preprocessing unit 160 sequentially inputs, into the prediction processing unit 120, moving median values of 200 points from a time point 200 points before the current time point to the current time point, and the prediction processing unit 120 predicts received power in the future (for example, after one second) from the current time point. Such processing makes it possible to reduce the influence of the instantaneous fluctuations and to realize handover processing that is not sensitive to the instantaneous fluctuations.

Detailed Operation Example

Next, operation examples (input data and output data) of the data preprocessing unit 160 and the prediction processing unit 120 (prediction model) will be described with reference to FIGS. 14 to 17. Here, it is assumed that the information to be predicted is received power. In FIGS. 14 to 17, t represents the current time, N represents the number of past series (the number of pieces of data) of time series data used for prediction, and M represents the number of predicted time series (that is, the received power at the time (or point) M ahead of t is predicted).

Note that, in any example, learning of the prediction model can be performed by use of an existing method such as an error back propagation method, using, for example, statistical values calculated from actual measurement values as correct answer data. In the following examples, median values are used as statistical values, but this is an example, and values other than the median values (for example, average values) may be used as statistical values.

Figure 14:
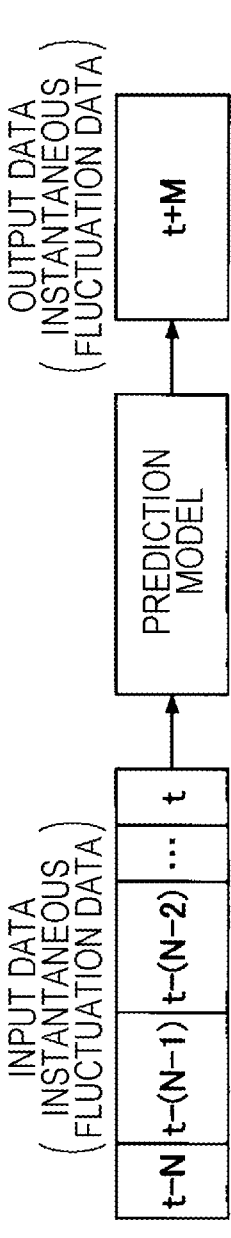
FIG. 14 is a diagram illustrating an example of input data and output data.

FIG. 14 illustrates input data and output data in a conventional technique as a reference. N+1 pieces of data at time points (times) from t−N to t (instantaneous fluctuation data not subjected to preprocessing) are input into the prediction model, and a predicted value (predicted value of instantaneous fluctuation data) at the time point t+M is output.

Figure 15:
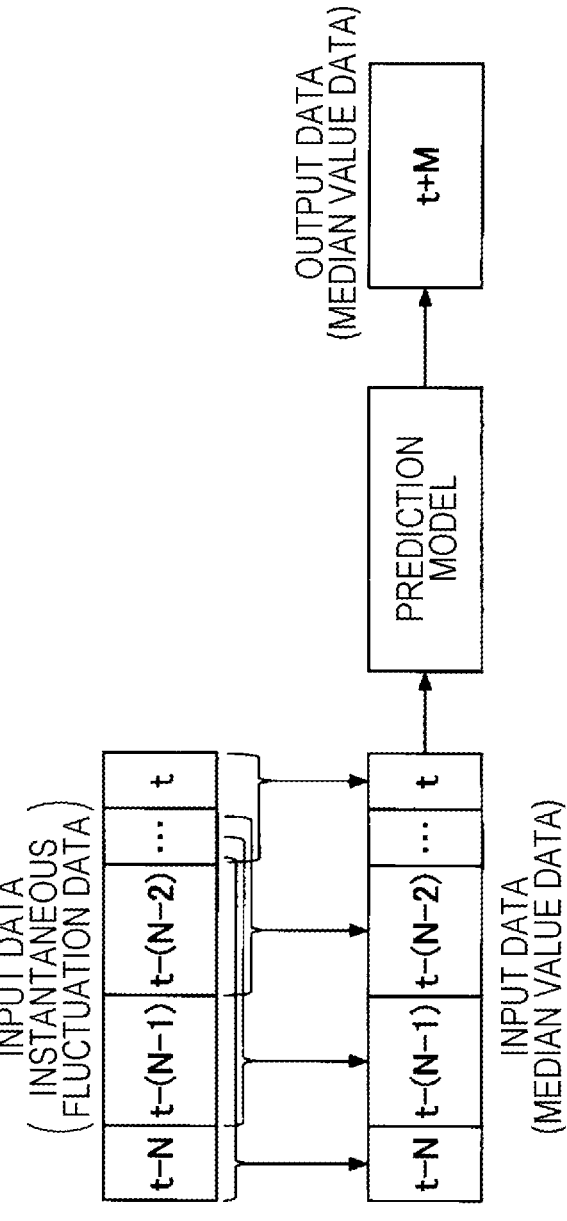
FIG. 15 is a diagram illustrating an example of input data and output data.

FIG. 15 illustrates Example 1 of input data and output data in the second embodiment. In Example 1, prediction is performed with each of the input data and the output data set as a predetermined section median value. The predetermined section may be a time (for example, 10 seconds) or a moving distance (for example, 10 m) of the user terminal 100. Hereinafter, the same applies to the "predetermined section".

The instantaneous fluctuation data is input to the data preprocessing unit 160. The data preprocessing unit 160 calculates section median values while sequentially moving the section by one piece of time series data, and sequentially inputs the calculated section median values into the prediction model. The prediction model outputs a predicted value (predicted value of a predetermined section median value) at the time point of t+M on the basis of the input data.

Figure 16:
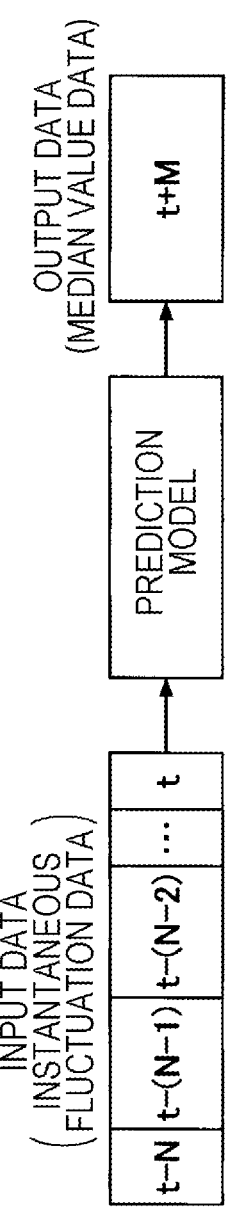
FIG. 16 is a diagram illustrating an example of input data and output data.

FIG. 16 illustrates Example 2 of input data and output data in the second embodiment. In Example 2, the input data is data including instantaneous fluctuations (data not subjected to preprocessing), and prediction is performed with the output data set as a predetermined section median value.

N+1 pieces of data at time points (times) from t−N to t (instantaneous fluctuation data not subjected to preprocessing) are input into the prediction model, and a predicted value (predicted value of a predetermined section median value) at the time point of t+M is output.

Figure 17:
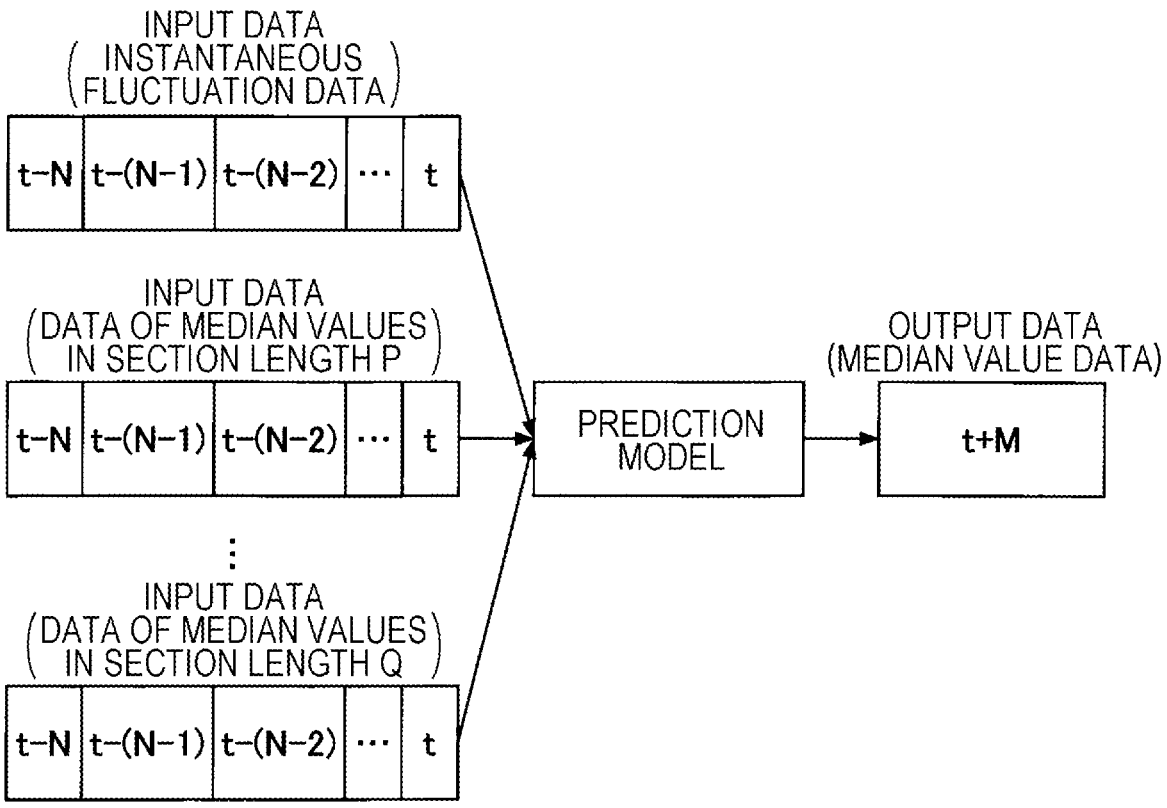
FIG. 17 is a diagram illustrating an example of input data and output data.

FIG. 17 illustrates Example 3 of input data and output data in the second embodiment. In Example 3, the input data is a plurality of data series such as data including instantaneous fluctuations, first section median value data, and second section median value data, and prediction is performed with the output data set as, for example, a second section median value. For example, the first section may be 5 m and the second section may be 10 m, or the first section may be 5 seconds and the second section may be 10 seconds. In addition, the number of data series of the plurality of data series is three as described above, which is an example. The number of data series of the plurality of data series may be two or more than three.

The instantaneous fluctuation data is input into the data preprocessing unit 160. The data preprocessing unit 160 calculates first section median values while sequentially moving the first section (for example, a section length P) by one piece of time series data. In addition, the data preprocessing unit 160 calculates second section median values while sequentially moving the second section (for example, a section length Q) by one piece of time series data. The data preprocessing unit 160 sequentially inputs the instantaneous fluctuation data, the first section median values, and the second section median values into the prediction model. The prediction model outputs a predicted value (predicted value of a predetermined section median value) at the time point of t+M on the basis of the input data.

In Examples 1 to 3 described above, as a processing section of a statistical value, a section length may be used in consideration of environment in the field of radio wave propagation or short section fluctuations for each frequency (for example, a section of 10 m at 4.5 GHz), or a section length may be dynamically set according to the position and moving speed of the user terminal. Furthermore, for example, in a case where the speed at which the user terminal 100 moves is equal to or less than a predetermined threshold, the section length may be set to a time unit such as 10 seconds.

Processing Flow

The processing of the data preprocessing unit 160 and the prediction processing unit 120 will be described with reference to FIGS. 18 and 19.

Figure 18:
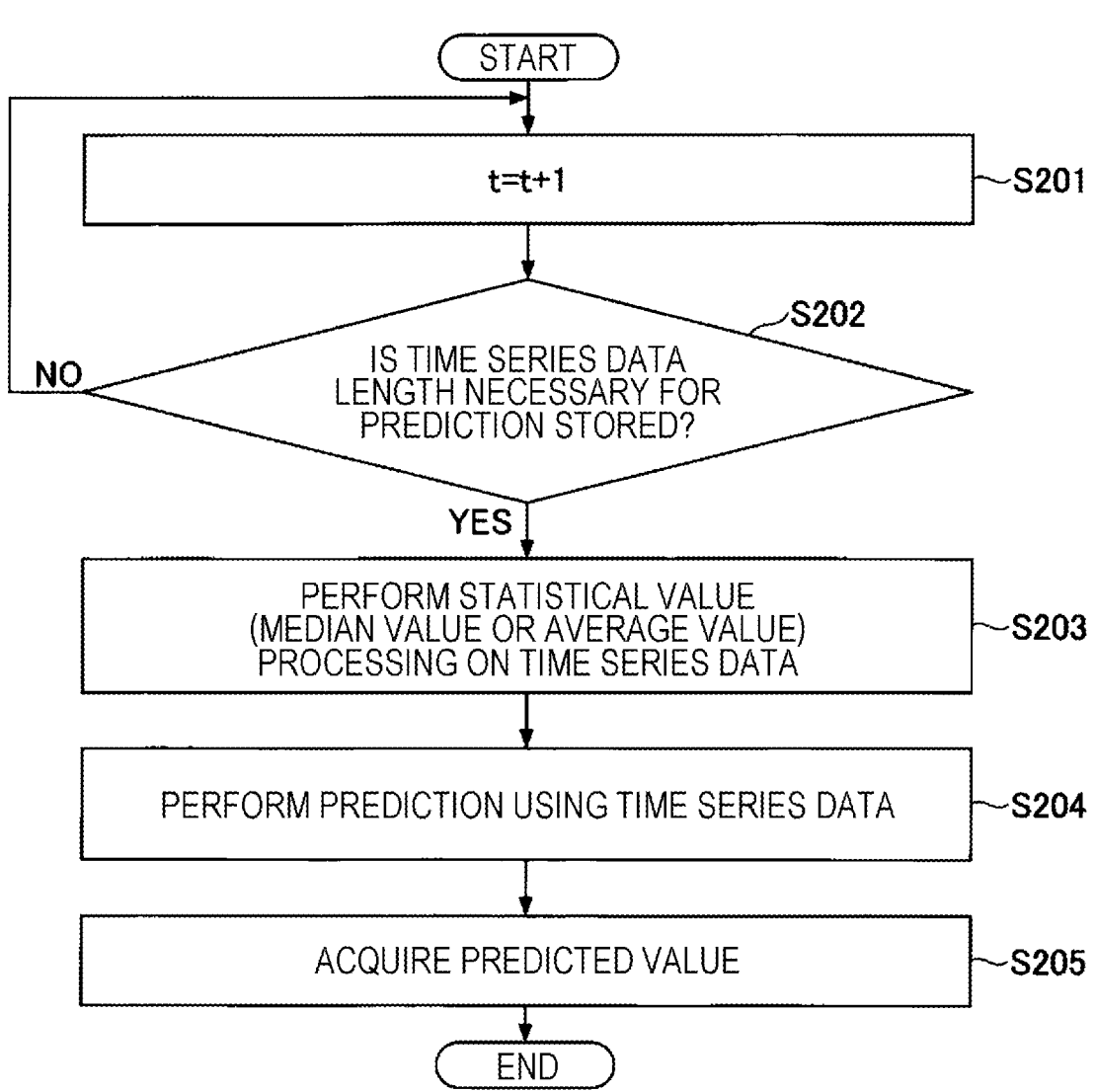
FIG. 18 is a diagram illustrating a processing procedure for acquiring a predicted value in the second embodiment.

FIG. 18 corresponds to Examples 1 and 3. In S202, the data preprocessing unit 160 confirms whether time series data necessary for statistical value processing is stored in the prediction input data holding unit 140, and if the time series data is stored, the processing proceeds to S203. If the time series data is not stored, the processing waits until the time series data is stored, and then proceeds to S203.

In S203, the data preprocessing unit 160 reads the time series data from the prediction input data holding unit 140, and performs the statistical processing (median value, average value, or the like) on the time series data. In S204, the data preprocessing unit 160 inputs the data subjected to the statistical processing into the prediction processing unit 120 and performs prediction. In S205, the prediction processing unit 120 acquires and outputs a predicted value.

Figure 19:
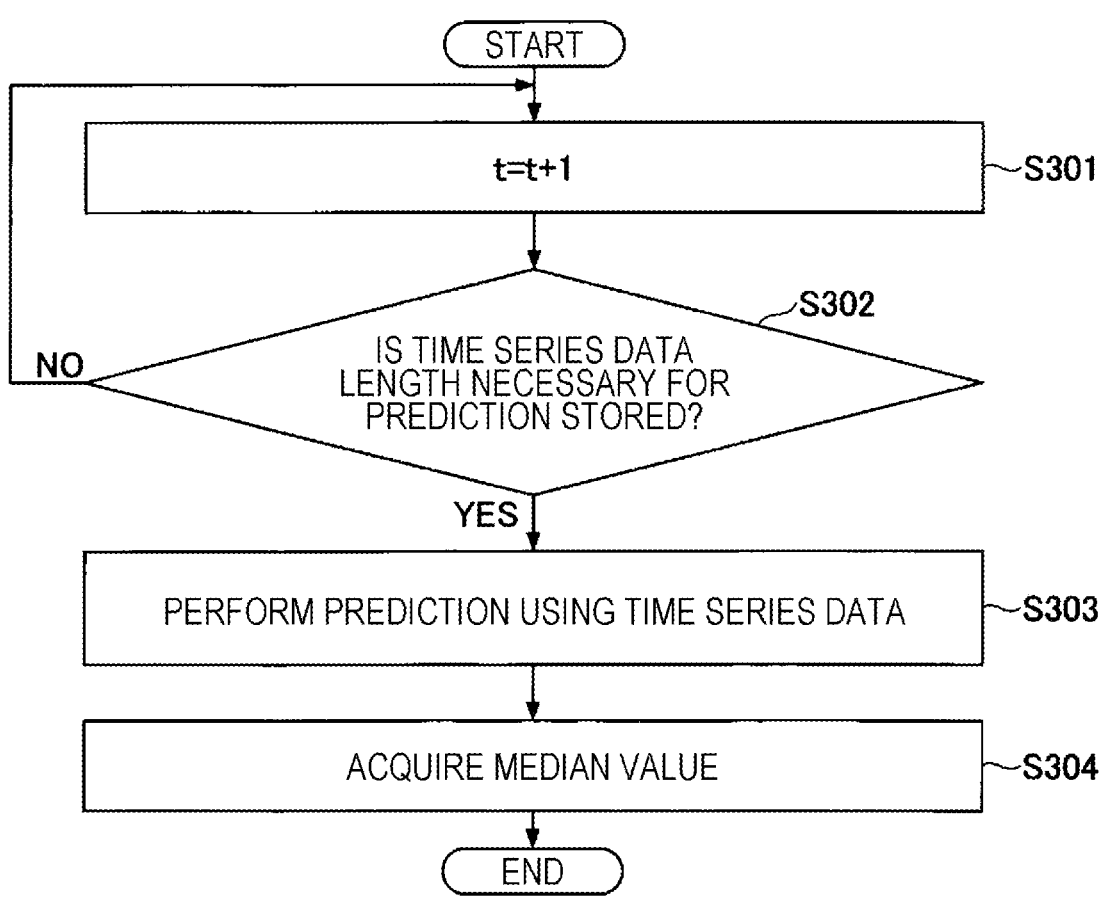
FIG. 19 is a diagram illustrating a processing procedure for acquiring a predicted value in the second embodiment.

FIG. 19 corresponds to Example 2. In S302, the prediction processing unit 120 confirms whether time series data necessary for prediction is stored in the prediction input data holding unit 140, and if the time series data is stored, the processing proceeds to S303. If the time series data is not stored, the processing waits until the time series data is stored, and then proceeds to S303.

In S303, the prediction processing unit 120 inputs time series data (instantaneous fluctuation data) and performs prediction. In S304, the prediction processing unit 120 acquires and outputs a predicted value of a statistical value (median value, average value, or the like).

Effects of Second Embodiment

According to the second embodiment, statistical values (median values or average values) corresponding to radio wave propagation characteristics are used as data to be predicted, so that it is possible to eliminate the influence of high-speed instantaneous fluctuations and achieve improvement in prediction accuracy. For example, accurate prediction can be performed on the order of seconds, and thus it is possible to utilize the prediction for the handover processing described in the first embodiment. Note that, for prediction on the order of seconds, there is a method of incorporating external information such as camera information in addition to parameters of received signals, and the technique according to the second embodiment can also be applied to such a method.

Summary of Embodiments

The present specification discloses at least a connection destination switching control method, a communication apparatus, and a program described in the following clauses.
(Clause 1)
A connection destination switching control method executed by a communication apparatus, the connection destination switching control method including:
   a data acquisition step of acquiring observed values of received power of signals transmitted from a base station;
   a prediction processing step of predicting future received power by using the observed values acquired in the data acquisition step as input data into a prediction model; and a connection destination switching processing step of executing control for handover based on the future received power predicted in the prediction processing step.
(Clause 2)
The connection destination switching control method according to clause 1, wherein, in the connection destination switching processing step, connection destination base stations as handover destinations are narrowed down based on the future received power.
(Clause 3)
The connection destination switching control method according to clause 1 or 2, wherein, in the connection destination switching processing step, a connection destination base station in which a set of handover processing occurs immediately after another set of handover processing is specified based on the future received power, the connection destination base station is excluded from possible connection destination base stations, and connection destination base stations as handover destinations are narrowed down.
(Clause 4)
The connection destination switching control method according to any one of clauses 1 to 3, wherein a statistical value obtained by performing preprocessing on the observed values acquired in the data acquisition step is used as the input data into the prediction model.
(Clause 5)
The connection destination switching control method according to clause 4, wherein the statistical value is a median value or an average value of the observed values in a predetermined section.
(Clause 6)
A communication apparatus including:
   a data acquisition unit that acquires observed values of received power of signals transmitted from a base station;
   a prediction processing unit that predicts future received power by using the observed values acquired by the data acquisition unit as input data into a prediction model; and
   a connection destination switching processing unit that executes control for handover based on the future received power predicted by the prediction processing unit.
(Clause 7)
A program for causing a computer to function as each unit in the communication apparatus according to clause 6.

Although the present embodiments have been described above, the present invention is not limited to such specific embodiments, and various modifications and changes can be made within the scope of the gist of the present invention described in the claims.

REFERENCE SIGNS LIST

100 user terminal
110 data acquisition unit
120 prediction processing unit
130 connection destination switching processing unit
140 prediction input data holding unit
150 prediction result data holding unit
160 data preprocessing unit
170 prediction result output unit
1000 drive device
1001 recording medium
1002 auxiliary storage device 1003 memory device
1004 CPU
1005 interface device
1006 display device
1007 input device

The invention claimed is:

1. A connection destination switching control method executed by a communication apparatus, the connection destination switching control method comprising:

acquiring observed values of received power of signals transmitted from each base station among a plurality of base stations;

predicting future received power by using the observed values as input data into a prediction model; and executing control for handover, by excluding, from handover candidates, a base station whose predicted future received power decreases with time, and by switching connection to a base station whose predicted future received power increases with time, wherein, in the executing of the control for the handover, a connection destination base station in which a set of handover processing occurs immediately after another set of handover processing is specified based on the future received power, the connection destination base station is excluded from possible connection destination base stations, and connection destination base stations as handover destinations are narrowed down.

2. The connection destination switching control method according to claim 1, wherein, in the executing of the control for the handover, connection destination base stations as handover destinations are narrowed down based on the future received power.

3. The connection destination switching control method according to claim 1, wherein a statistical value obtained by performing preprocessing on the observed values is used as the input data into the prediction model.

4. The connection destination switching control method according to claim 3, wherein the statistical value is a median value or an average value of the observed values in a predetermined section.

5. The connection destination switching control method according to claim 1, wherein the executing is performed by:

limiting monitoring target base stations to one or more base stations whose predicted future received power exceeds a predetermined threshold, excluding, from handover candidate base stations among the limited monitoring targets, the base station whose predicted future received power decreases with time, and switching a connection to the base station whose predicted future received power increases with time.

6. A communication apparatus comprising:

a memory; and a processor coupled to the memory and configured to:

acquire observed values of received power of signals transmitted from each base station among a plurality of base stations;

predict future received power by using the observed values as input data into a prediction model; and execute control for handover, by excluding, from handover candidates, a base station whose predicted future received power decreases with time, and by switching connection to a base station whose predicted future received power increases with time, wherein, in the executing of the control for the handover, a connection destination base station in which a set of handover processing occurs immediately after another set of handover processing is specified based on the future received power, the connection destination base station is excluded from possible connection destination base stations, and connection destination base stations as handover destinations are narrowed down.

7. A non-transitory computer-readable recording medium storing a program for causing a computer to function as the communication apparatus according to claim 6.

* * * * *